US00RE44956E

(19) United States
(12) Reissued Patent
Richardson et al.

(10) Patent Number: US RE44,956 E
(45) Date of Reissued Patent: *Jun. 24, 2014

(54) DRILLING METHOD AND APPARATUS

(71) Applicants: Allan S. Richardson, The Woodlands, TX (US); Beat Küttle, The Woodlands, TX (US)

(72) Inventors: Allan S. Richardson, The Woodlands, TX (US); Beat Küttle, The Woodlands, TX (US)

(73) Assignee: Canrig Drilling Technology Ltd., Houston, TX (US)

( * ) Notice: This patent is subject to a terminal disclaimer.

(21) Appl. No.: 13/846,125

(22) Filed: Mar. 18, 2013

Related U.S. Patent Documents

Reissue of:
(64) Patent No.: 6,050,348
Issued: Apr. 18, 2000
Appl. No.: 08/877,738
Filed: Jun. 17, 1997

U.S. Applications:
(63) Continuation of application No. 13/206,235, filed on Aug. 9, 2011, which is an application for the reissue of Pat. No. 6,050,348.

(51) Int. Cl.
*E21B 44/00* (2006.01)

(52) U.S. Cl.
USPC ..... 175/26; 175/24; 175/27; 175/40; 175/45; 175/64

(58) Field of Classification Search
USPC ..... 175/24, 26, 27, 40, 45, 61, 195
See application file for complete search history.

(56) References Cited

U.S. PATENT DOCUMENTS

| | | | |
|---|---|---|---|
| 3,658,138 | A | 4/1972 | Gosselin |
| 4,128,888 | A | 12/1978 | Sheldon et al. |
| 4,146,347 | A | 3/1979 | Woods |
| 4,165,789 | A | 8/1979 | Rogers |
| 4,174,577 | A | 11/1979 | Lewis |
| 4,187,546 | A | 2/1980 | Heffernan et al. |
| 4,195,699 | A | 4/1980 | Rogers et al. |
| 4,281,723 | A | 8/1981 | Edmond et al. |
| 4,354,233 | A | 10/1982 | Zhukovsky et al. |
| 4,453,603 | A | 6/1984 | Voss et al. |

(Continued)

FOREIGN PATENT DOCUMENTS

GB 596715 1/1948

OTHER PUBLICATIONS

J.F. Brett and T.M. Warren, "Field Experiences With Computer-Controlled Drilling," SPE 20107, copyright 1990, 16 pages.

(Continued)

*Primary Examiner* — Jennifer H Gay
(74) *Attorney, Agent, or Firm* — Enrique Abarca; Abel Law Group, LLP

(57) ABSTRACT

A method and apparatus for precisely controlling the rotation of a drill string. A sensor monitors the rotation of the drill string and transmits the rotational information to a computer. The computer controls the rotation of the motor driving the drill string and rotates the drill string through an angle input by the operator. The computer may also utilize the sensor's rotational information to oscillate the drill string between two predetermined angles. The computer may also receive orientation information from a downhole tool sensor. The downhole tool information may be combined with the rotational information to enable the computer to accurately reorient the downhole tool.

8 Claims, 5 Drawing Sheets

(56) References Cited

U.S. PATENT DOCUMENTS

| | | | |
|---|---|---|---|
| 4,601,353 | A | 7/1986 | Schuh et al. |
| 4,739,325 | A | 4/1988 | MacLeod |
| 4,794,534 | A | 12/1988 | Millheim |
| 4,854,397 | A | 8/1989 | Warren et al. |
| 5,042,597 | A | 8/1991 | Rehm et al. |
| 5,259,468 | A | 11/1993 | Warren et al. |
| 5,316,091 | A | 5/1994 | Rasi et al. |
| 5,337,839 | A | 8/1994 | Warren et al. |
| 5,343,152 | A | 8/1994 | Kuckes |
| 5,390,748 | A | 2/1995 | Goldman |
| 5,425,429 | A | 6/1995 | Thompson |
| 5,448,227 | A | 9/1995 | Orban et al. |
| 5,513,710 | A | 5/1996 | Kuckes |
| 5,803,185 | A | 9/1998 | Barr et al. |
| 6,050,348 | A | 4/2000 | Richardson et al. |

OTHER PUBLICATIONS

T.A. Inglis, "Directional Drilling," Petroleum Engineering and Development Studies, vol. 2, copyright 1987, 75 pages.
"Portable Top Drive Drilling System," Tesco Drilling Technology, dated 1994, 43 pages.
1990-91 Composite Catalog of Oil Field Equipment & Services, vol. 2, 6 pages.
1990-91 Composite Catalog of Oil Field Equipment & Services, vol. 1, 1 page.
1994-95 Composite Catalog of Oil Field Equipment & Services, vol. 2, 8 pages.
1994-95 Composite Catalog of Oil Field Equipment & Services, vol. 1, 2 pages.
1992-93 Composite Catalog of Oil Field Equipment & Services, vol. 2, 2 pages.
Civil Action No. 6:09-cv-00414, *Canrig Drilling Technology Ltd.* v. *Omron Oilfield and Marine, Inc., et al.,* In the USDC Eastern District of TX, Civil Docket Sheet (Oct. 26, 2011).
Civil Action No. 6:09-cv-00414, Protective Order (Feb. 23, 2010).
Civil Action No. 6:09-cv-00414, Original Complaint (Sep. 16, 2009).
Civil Action No. 6:09-cv-00414, Report on the Filing/Determination of an Action Regarding Patent/Trademark (Sep. 16, 2009).
Civil Action No. 6:09-cv-00414, Helmerich & Payne, Inc.'s Answer and Counterclaim to Plaintiff's Original Complaint (Nov. 5, 2009).
Civil Action No. 6:09-cv-00414, Omron Oilfield and Marine, Inc.'s Answer and Counterclaim to Plaintiff's Complaint (Nov. 6, 2009).
Civil Action No. 6:09-cv-00414, Canrig Drilling Technology Ltd's Answer to Helmerich & Payne Declaratory Judgement Counterclaim (Nov. 23, 2009).
Civil Action No. 6:09-cv-00414, Cangrig Drilling Technology's Answer to Omron Oilfield and Marine's Declaratory Judgment Counterclaim (Nov. 23, 2009).
Civil Action No. 6:09-cv-00414, Helmerich & Payne's First Amended Answer and Counterclaims to Plaintiff's Original Complaint (Mar. 25, 2010).
Civil Action No. 6:09-cv-00414, Helmerich & Payne's Notice of Service of Invalidity Contentions (Mar. 25, 2010).
Civil Action No. 6:09-cv-00414, Canrig's Answer to Helmerich & Payne's First Amended Counterclaim (Apr. 15, 2010).
Civil Action No. 6:09-cv-00414, Joint Claim Construction Statement (Oct. 25, 2010).
Civil Action No. 6:09-cv-00414, Partis' Joint Statement Re: Technical Advisor (Nov. 4, 2010).
Civil Action No. 6:09-cv-00414, Canrig's Notice of Tutorial Submission (Dec. 2, 2010).
Civil Action No. 6:09-cv-00414, Defendants' Notice of Filing Markman Tutorial (Dec. 2, 2010).
Civil Action No. 6:09-cv-00414, Canrig's Local Patent Rule 4-S(a) Opening Brief on Claim Construction (Dec. 3, 2010).
Civil Action No. 6:09-cv-00414, Defendants' Response to Canrig's Brief on Claim Construction (Dec. 13, 2010).
Civil Action No. 6:09-cv-00414, Canrig's Reply to Defendants' Response Brief on Claim Construction (Dec. 30, 2010).
Civil Action No. 6:09-cv-00414, Notice of Joing Claim Construction Chart Submission (Jan. 6, 2011).
Civil Action No. 6:09-cv-00414, Minute Entry for Jan. 13, 2011 Markman hearing (Jan. 13, 2011).
Civil Action No. 6:09-cv-00414, Memorandum Opinion, Court interprets claim language (Feb. 11, 2011).
Civil Action No. 6:09-cv-00414, Official Transcript of Jan. 13, 2011 Markman Hearing (Feb. 18, 2011).
Civil Action No. 6:09-cv-00414, Helmerich's Notice of Service of First Amended Invalidity Contentions (Feb. 18, 2011).
Civil Action No. 6:09-cv-00414, Defendants' Joint Motion to Amend Invalidity Contentions (Mar. 18, 2011).
Civil Action No. 6:09-cv-00414, Defendants' Request to file Partial Motion for Summary Judgment of Non-Infringement as to Omron Orientation Feature (Mar. 28, 2011).
Civil Action No. 6:09-cv-00414, Defendants Request to File Partial Motion for Summary Judgment of Invalidity of Claims 1-4 Based on Anticipation (Mar. 28, 2011).
Civil Action No. 6:09-cv-00414, Helmerich's Motion to File Partial Summary Judgment of No Willful Infringement (Mar. 28, 2011).
Civil Action No. 6:09-cv-00414, Defendants' Request for Leave to File Motion to Exclude Canrig's Damage Expert (Mar. 28, 2011).
Civil Action No. 6:09-cv-00414, Omron's Request to File Motion Summary Judgment of No Willful Infringement (Mar. 28, 2011).
Civil Action No. 6:09-cv-00414, Omron's Request to File Motion Summary Judgment of Invalidity of Claims 1, 2, 4, 5 (Mar. 28, 2011).
Civil Action No. 6:09-cv-00414, Canrig's Response to Defendants' Joint Motion to Amend Invalidity Contentions (Mar. 30, 2011).
Civil Action No. 6:09-cv-00414, Canrig's Response to Defendants' Request to File Partial Motion for Summary Judgment of No Willful Infringement (Apr. 8, 2011).
Civil Action No. 6:09-cv-00414, Canrig's Response to Helmerich's Request to File Partial Motion for Summary Judgment of No Willful Infringement (Apr. 8, 2011).
Civil Action No. 6:09-cv-00414,Canrig's Response to Defendants' Request to File Partial Motion for Summary Judgment of Invalidity of Claims 1-4 Based on Anticipation(Apr. 11, 2011).
Civil Action No. 6:09-cv-00414, Canrig's Response to Defendants' Request to File MSJ of Invalidity of Claims 1,2,4,5 for Lack of Enablement (Apr. 11, 2011).
Civil Action No. 6:09-cv-00414,Canrig's Response to Defendants Requeset to File Partial Motion for Summary Judgement of Non-Infringment as to Ornron Orientation Feature(Apr. 11, 2011).
Civil Action No. 6:09-cv-00414, Defendants' Reply to Canrig's Response to Defendants' Motion to Amend Invalidity Contentions (Apr. 12, 2011).
Civil Action No. 6:09-cv-00414, Canrig's Response to Defendants' Request to File Motion to Exclude Canrig's Damages Expert (Apr. 12, 2011).
Civil Action No. 6:09-cv-00414, Omron's Reply to Canrig's Response to Omron's Request to File Motion for Summary Judgment of No Willful Infringement (Apr. 13, 2011).
Civil Action No. 6:09-cv-00414, Helmerich's Reply to Canrig's Response to Request to File PMSJ on Willfulness (Apr. 13, 2011).
Civil Action No. 6:09-cv-00414, Omron's Reply to Camig's Response to Omron's Request to File Motion for Summary Judgment of Non-Enablement (Apr. 18, 2011).
Civil Action No. 6:09-cv-00414, Defendants' Reply to Canrig's Response to Defendants Request to File Motion to Exclude Canrig's Damage Expert (Apr. 18, 2011).
Civil Action No. 6:09-cv-00414, Helmerich's Reply to Canrig's Response to Request to File Partial Motion for Summary Judgment of Non-Infringement (Apr. 18, 2011).
Civil Action No. 6:09-cv-00414, Defendants' Reply to Canrig's Response to Defendants' Request to File Partial Motion for Summary Judgment on Anticipation (Apr. 18, 2011).
Civil Action No. 6:09-cv-00414, Canrig's Sur-Reply in Oppotion to Defendants' Motion for Leave to Amend Invalidity Contentions (Apr. 21, 2011).
Civil Action No. 6:09-cv-00414, Defendants' Second Joint Motion to Amend Invalidity Contentions (Apr. 21, 2011).
Civil Action No. 6:09-cv-00414, Order regarding Defendants' Requests to file motions for summary judgments (Apr. 21, 2011).

(56) References Cited

OTHER PUBLICATIONS

Civil Action No. 6:09-cv-00414, Helmerich's Motion for Leave to File Second Amended Answer and Counterclaims to Plaintiffs Original Complaint (Apr. 25, 2011).
Civil Action No. 6:09-cv-00414, Helmerich's Second Amended Answer and Counterclaims to Plaintiffs' Original Complaint (Apr. 25, 2011).
Omron's Unopposed Motion for Leave to File First Amended Answer and Counterclaim (Apr. 29, 2011).
Civil Action No. 6:09-cv-00414, Omron's First Amended Answer and Counterclaim (Apr. 29, 2011).
Civil Action No. 6:09-cv-00414, Order on Defendants' Joint Motion to Amend Invalidity Contentions (May 2, 2011).
Civil Action No. 6:09-cv-00414, Canrig's Response to Defendants' Second Joint Motion to Amend Invalidity Contentions (May 6, 2011).
Civil Action No. 6:09-cv-00414, Canrig's Response of No Opposition to Helmerich's Motion for Leave to File Second Amended Answer (May 12, 2011).
Civil Action No. 6:09-cv-00414, Omron's Motion for Partial Summary Judgment of No Willful Infringement (May 13, 2011).
Civil Action No. 6:09-cv-00414, Defendants' Reply in Support of Defendants' Second Joint Motion to Amend Invalidity Contentions (May 16, 2011).
Civil Action No. 6:09-cv-00414, Defendants' Unopposed Third Joint Motion to Amend Invalidity Contentions (May 18, 2011).
Civil Action No. 6:09-cv-00414, Canrig's Proposed Findings of Fact and Conclusions of Law (May 19, 2011).
Civil Action No. 6:09-cv-00414, Proposed Joint Pretrial Order (May 19, 2011).
Civil Action No. 6:09-cv-00414, Defendants' Proposed Findings of Fact and Conclusions of Law on Inequitable Conduct (May 19, 2011).
Civil Action No. 6:09-cv-00414, Defendants' Motion to Clarify Court's Order Regarding Amendment of Invalidity Contentions or Alternatively Reconsider Order (May 25, 2011).
Civil Action No. 6:09-cv-00414, Canrig's Response in Opposition to Defendants' Motion to Clarify or Alternatively to Reconsider Court's Order on Invalidity Contentions (Jun. 15, 2011).
Civil Action No. 6:09-cv-00414, Defenants' Notice of Disclosure of Prior Art Pursuant to 35 USC §282 (Jun. 17, 2011).

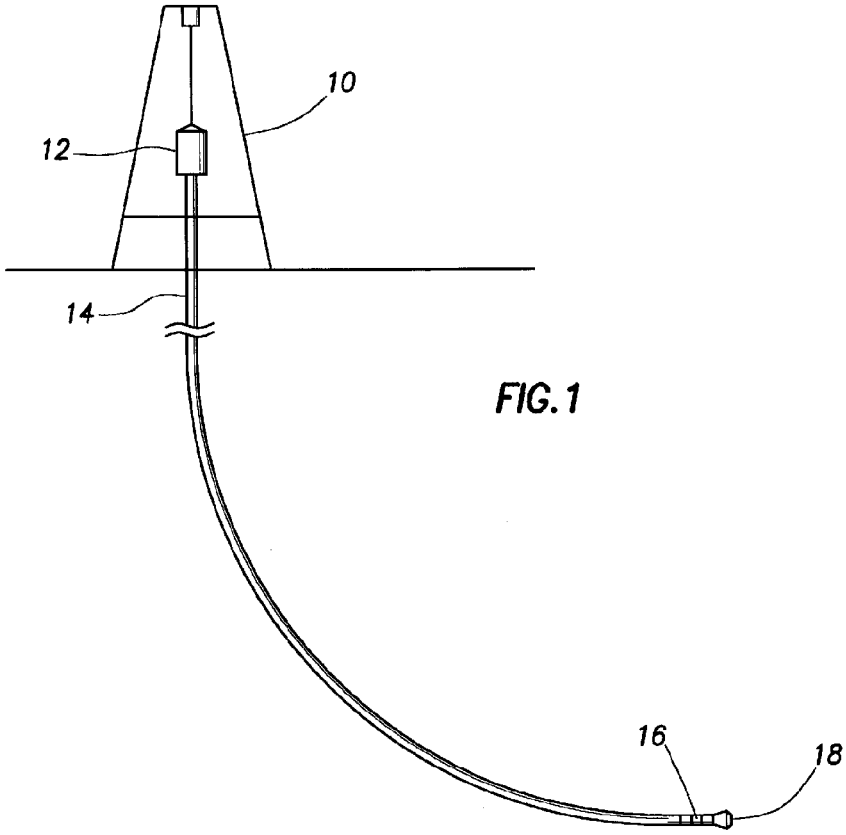
FIG. 1
FIG. 3
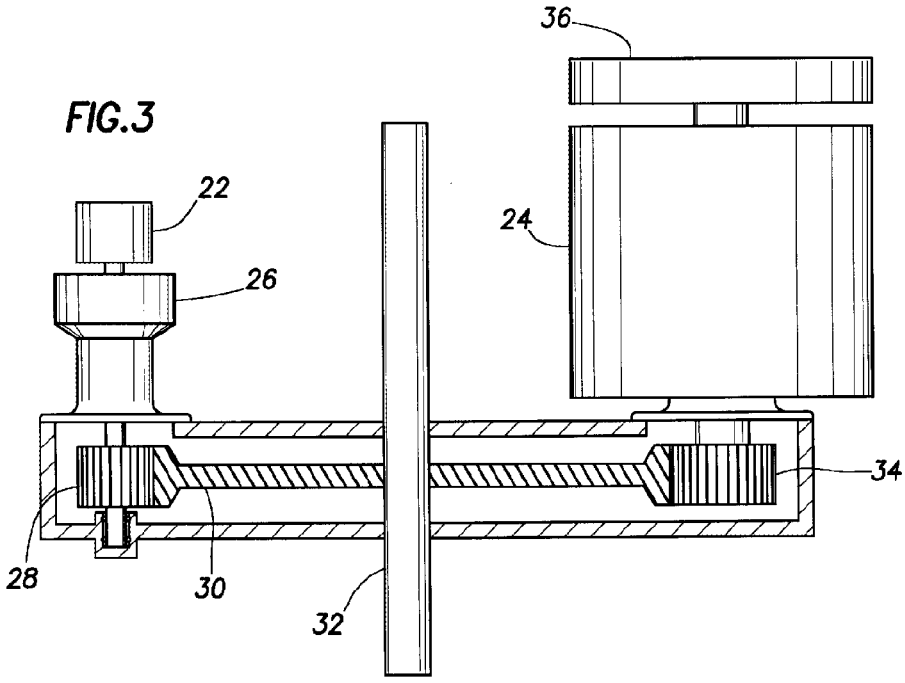

DRILLING METHOD AND APPARATUS

Matter enclosed in heavy brackets [ ] appears in the original patent but forms no part of this reissue specification; matter printed in italics indicates the additions made by reissue.

*RELATED APPLICATION*

*This application is a continuation reissue of and claims benefit under 35 U.S.C. §120 to application Ser. No. 13/206,235 filed Aug. 9, 2011, which is an application for reissue of U.S. Pat. No. 6,050,348. More than one reissue application has been filed for U.S. Pat. No. 6,050,348.*

BACKGROUND OF THE INVENTION

Subterranean drilling typically involves rotating a drill bit on a downhole motor at the remote end of a string of drill pipe. The rotating bit works its way through underground formations opening a path for the drill pipe that follows. Drilling fluid forced through the drill pipe may rotate the motor and bit. The assembly may be directed or steered from a vertical drill path in any number of directions. Steering allows the operator to guide the wellbore to desired underground locations. For example, to recover an underground hydrocarbon deposit, the operator may first drill a vertical well to a point above the reservoir. Then the operator may steer the wellbore to drill a deflected, or directional, well that optimally penetrates the deposit. The well may pass horizontally through the deposit. The greater the horizontal component of a well or bore, the greater the friction between the bore and the drill string. This friction slows drilling by reducing the force pushing the bit into new formations.

Directional drilling, or steering, is typically accomplished by orienting a bent segment of the downhole motor driving the bit. Rotating the drill string changes the orientation of the bent segment and the "toolface", and thus the direction the bit will advance. To effectively steer the assembly, the operator must first determine the current toolface orientation. The operator may measure the toolface orientation with what is commonly known as "measurement while drilling" or "MWD" technology. If the drilling direction needs adjustment, the operator must rotate the drill string to change the orientation of toolface.

If no friction acts on the drill string or if the drill string is very short, simply rotating the drill string will correspondingly rotate the segment of pipe connected to the bit. However, during directional drilling, the drilling operator deflects the well or bore over hundreds of feet so that the bend in the drill string is not sudden. Thus directional drilling is often performed at the end of a drill string that is several thousand feet long. Also, directional drilling increases the horizontal component of a well and thus increases the friction between the drill string and the well. The drill string is elastic and stores torsional tension like a spring. The drill string may require several rotations at the surface to overcome the friction between the surface and the bit. Thus, the operator may rotate the drill string several revolutions at the surface without moving the toolface.

Typical drilling drives, such as top drives and independently driven rotary tables, prevent drill string rotation with a brake. To adjust the orientation of the toolface, the operator must release the brake and quickly supply sufficient power to the motor to overcome the torsional tension stored in the drill string and to advance the drill string the appropriate amount at surface to reorient the toolface at the end of the drill string. If the brake is released and insufficient power is supplied to the motor, the drill string will backlash. If too much power is supplied to the motor, the motor will quickly rotate the toolface past its desired orientation. If the initial brake release and motor power-up are successful, the operator must then stop the motor with the brake once the operator thinks the drill string has rotated sufficiently to properly reorient the toolface. If the operator's guess is too high, the motor will rotate the toolface past the desired orientation. If the operator's guess is too small, the motor may rotate the drill string at the surface but the toolface will not rotate sufficiently to be properly oriented.

SUMMARY OF THE INVENTION

The present invention provides apparatus and methods for eliminating some or all of the guess work involved in orienting a steerable downhole tool by precisely controlling the angle of rotation of the drill string drive motor. One embodiment allows the operator to designate the exact angle the motor will advance the drill string at the surface. Another embodiment of the invention prevents backlash. The invention also exploits the elasticity of the drill string to reduce the friction between the drill string and the bore by continuously oscillating the drill string between the bit and the surface without disturbing the orientation of the toolface. In another embodiment, the computer controlling the drive motor receives toolface orientation information from MWD sensors and automatically rotates the drill string at the surface to orient the toolface as desired.

In one embodiment, the drill string drive motor is controlled by a computer. The computer monitors the rotation of the drill string at the surface through sensors. The computer is programmed to advance the drill string the precise angle entered by the operator.

In another embodiment, the drill string drive motor is controlled by a computer. The computer monitors the rotation of the drill string at the surface through sensors. The computer is programmed to rotate the drill string a predetermined angle and then to reverse the direction of rotation and rotate the drill string back through the same predetermined angle.

In another embodiment, a rotation sensor monitors the rotation of the drill string at the surface. A MWD sensor monitors the orientation of a downhole tool. Data from the rotation sensor and from the MWD sensor is transmitted to a computer that controls the drill string drive motor.

In yet another embodiment, the motor rotating the drill string is hydraulic. A control valve causes fluid to advance the motor in a first direction when the control valve is open. A counterbalance valve prevents rotation of the motor in the first direction when the control valve is closed.

One embodiment involves monitoring the rotation of a drill string, transmitting the rotational data to a computer, controlling the motor rotating a drill string with the computer and instructing the computer to advance the motor a predetermined angle.

Another embodiment involves monitoring the rotation of a drill string, transmitting the rotational data to a computer, controlling the motor rotating a drill string with the computer and instructing the computer to oscillate the motor between predetermined angles.

Yet another embodiment involves monitoring the rotation of a drill string, monitoring the orientation of a downhole tool, transmitting the rotational data and orientation data to a computer, controlling the motor rotating a drill string with the computer and instructing the computer to achieve or maintain a desired downhole tool orientation by controlled actuation of the motor.

BRIEF DESCRIPTION OF THE DRAWING

FIG. 1 is a schematic view of a directionally drilled well;

FIG. 3 is a partial cross-section of an elevation view of a top drive motor according to the present invention;

DESCRIPTION OF THE PREFERRED EMBODIMENTS

Figure 2:
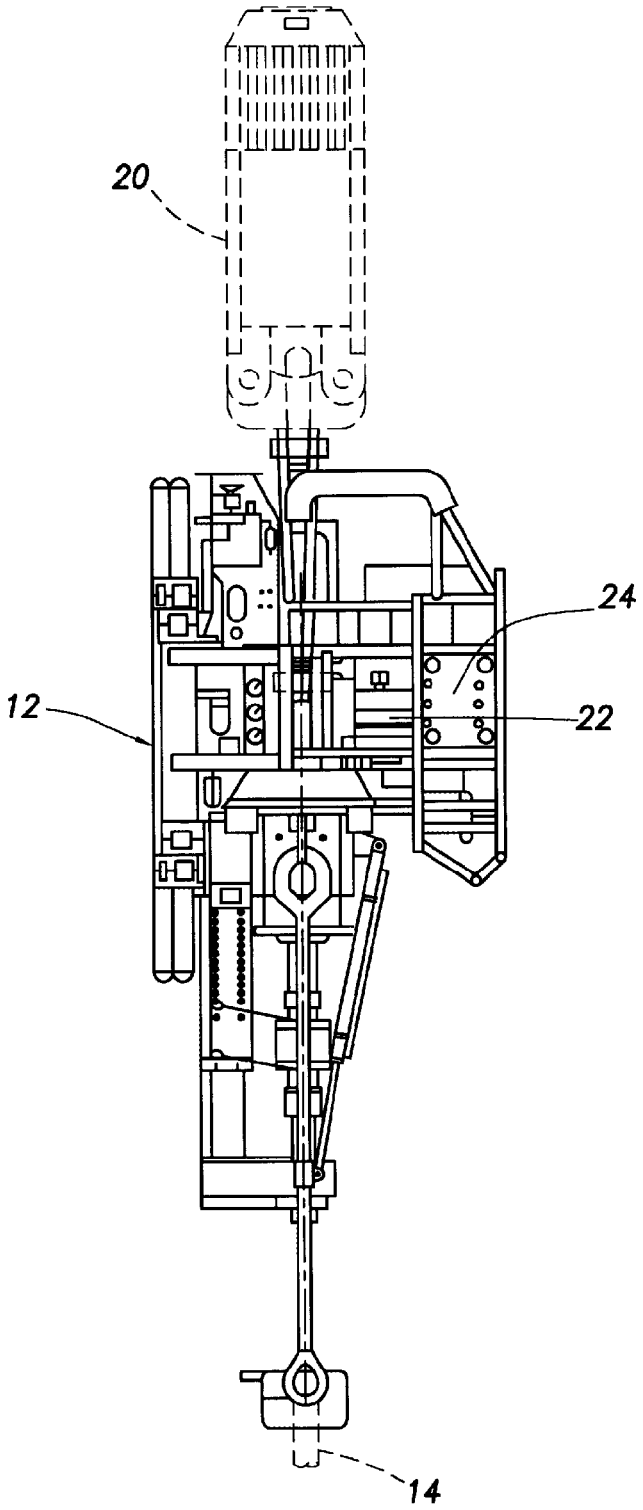
FIG. 2 is a side elevation view of a top drive motor according to the present invention.

FIG. 1 depicts a drilling rig 10 with a top drive 12. (While a top drive 12 is shown, the principles of this invention apply to any drive system including top drive, power swivel or rotary table.) The top drive 12 is connected to a drill string 14. The drill string 14 has deviated from vertical. As shown, the drill string 14 rests against the well bore where the bore is not vertical. A downhole motor 16 with a bent section is at the end of the drill string 14. A bit 18 is connected to the downhole motor 16. The downhole motor 16 is driven by drilling fluid. While a drilling fluid driven motor is shown, the principles of this invention apply to any downhole tool requiring rotational manipulation from the surface.

FIG. 2 is a detailed depiction of a top drive 12. The top drive 12 is suspended by a traveling block 20. The top drive 12 has a hydraulic motor 22 and an electric motor 24. FIG. 3 is a simplified depiction of a top drive 12. The electric motor 24 is the primary source of drilling power when the top drive 12 is used to rotate the drill string 14 for drilling. The electric motor 24 may generate more than 1,000 horsepower. The hydraulic motor 22 in this embodiment is much smaller than the electric motor 24. The hydraulic motor 22 is connected to a gearbox 26 that gears down the hydraulic motor 22 so that the hydraulic motor 22 rotates the drill string 14 at only one to two r.p.m. Because the hydraulic motor 22 is geared down, it may produce high torque.

The top drive hydraulic system selectively provides pressurized fluid to the hydraulic motor to cause the motor to rotate. The top drive hydraulic system also has a counterbalance valve that allows the hydraulic motor 22 to act as a brake and to transition from its brake mode to a rotation mode without any backlash. The counterbalance valve maintains fluid pressure on the hydraulic motor to prevent its rotation when the hydraulic system is not providing pressurized fluid to rotate the motor. One suitable counterbalance valve is P/N CBCG-LKN-EBY manufactured by Sun Hydraulics Corp. of Sarasota, Fla.

The hydraulic motor gearbox 26 is connected to a hydraulic motor pinion 28. The hydraulic motor pinion 28 engages a bull gear 30 that is connected to the top drive quill 32. The top drive quill 32 engages the drill string 14. The bull gear 30 also engages the electric motor pinion 34. A brake housing 36 is shown above the electric motor 24.

Figure 4A:
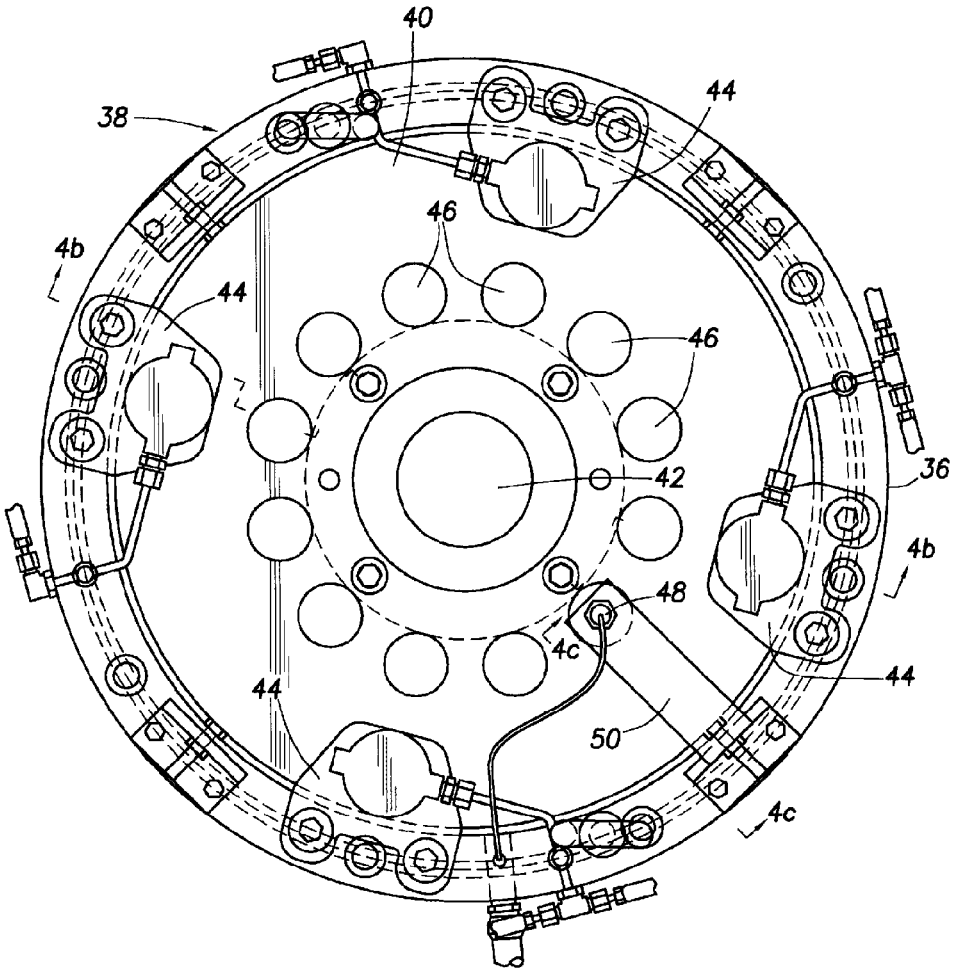
FIG. 4a is a plan view of one aspect of the present invention.

FIG. 4a depicts the brake assembly 38 as found within the brake housing 36. A brake disk 40 is attached to a brake shaft 42 that is connected to the electric motor 24. Calipers 44 are located around the outer edge of the brake disk 40. The calipers 44 are hydraulically activated to engage the disk brake 40 and to thus generate braking friction. Twelve sensing apertures 46 are located in the interior of the brake disk 40. The sensing apertures 46 are the same size and are located the same distance from the center of the brake disk 40. The sensing apertures 46 are evenly spaced from one another. In other words, the center of each sensing aperture 46 is 30 degrees from the center of each adjacent sensing aperture 46 along their common radius from the center of the brake disk 40.

Figure 4B:
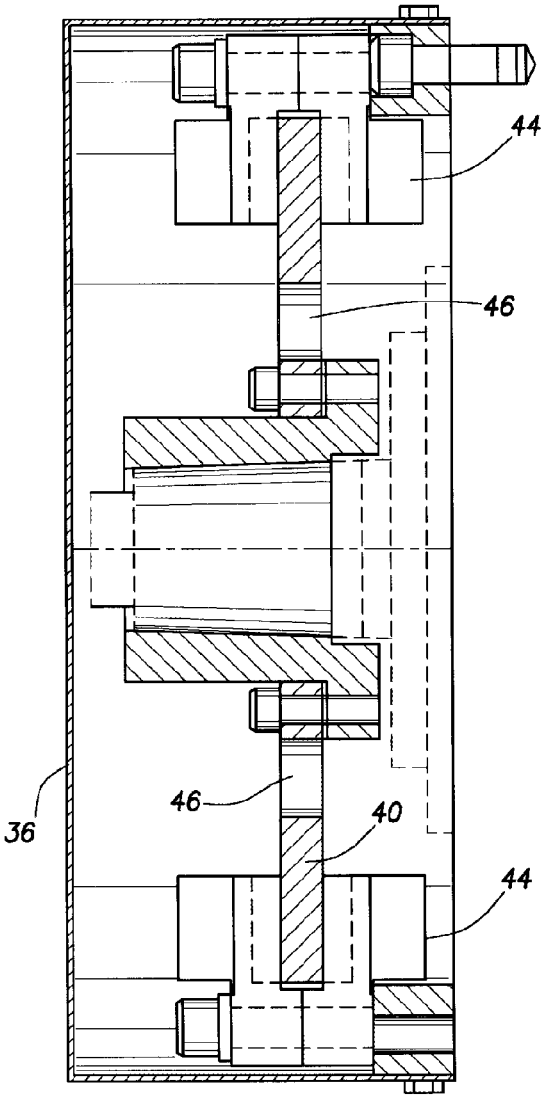
FIG. 4b is a partial cross-section of a side elevation view of one aspect of the present invention.
Figure 4C:
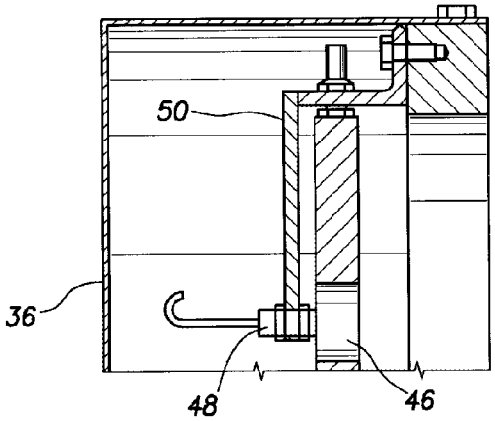
FIG. 4c is a detailed partial cross-section of a side elevation view of one aspect of the present invention.

A sensor 48 is held at the center of the sensing apertures 46 by a sensor bracket 50. The sensor 48 detects the rotation of the brake disk 40 by differentiating between the brake disk 40 and the absence of the brake disk 40 in the sensing aperture 46. One suitable sensor 48 is an embeddable inductive sensor such as part number Bi 5-G18-AP6X manufactured by Turck Inc. of Minneapolis, Minn. FIGS. 4b and 4c depict partial cross-sectional views of the brake housing 36 and the brake assembly 38. Because the electric motor 24 is connected to the top drive quill 32 through reducing gears, the twelve sensing apertures 46 and sensor 48 generate a pulse for each six degrees of rotation of the top drive quill 32 with a typical gear ratio.

The invention is not limited to an inductive sensor used with a brake disk as previously described. Any device that detects the rotation of the drill string 14 may be used. For example, a target wheel with sensing apertures as described above may be attached to the top drive shaft 32 or any mechanism in rotational engagement with the top drive quill 32. A sensor 48 may then be used as described above to detect the rotation of the target wheel. Alternatively, a hermetically sealed optical encoder could be attached to the top drive quill 32 to detect the rotation of the drill string. The invention is sufficiently broad to capture any device that detects the rotation of the drill string.

Figure 5:
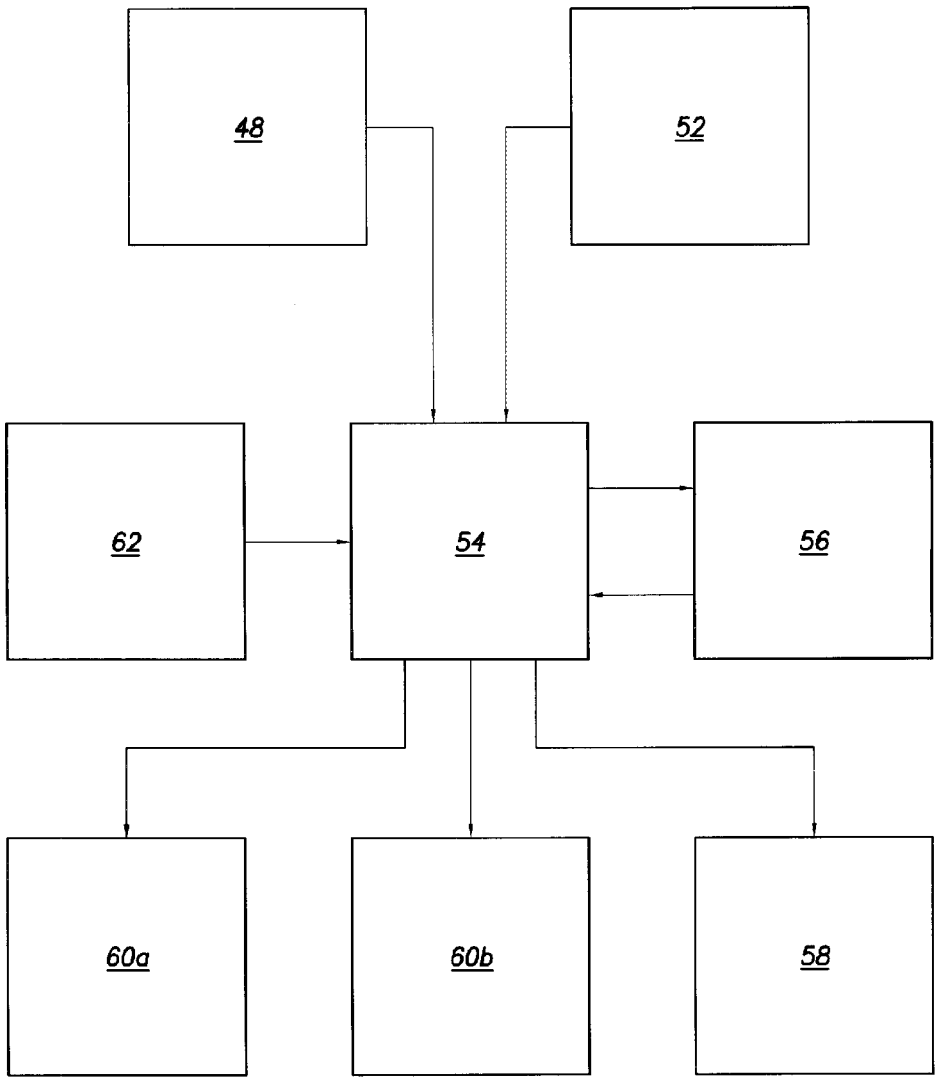
FIG. 5 is a schematic view of certain aspects of the present invention.

FIG. 5 is a schematic representation of the interaction of various components. The hydraulic system for the hydraulic motor 22 has a bidirectional differential pressure transducer 52. The bidirectional differential pressure transducer 52 detects the pressure differential on the hydraulic motor 22. This pressure differential can be used to calculate the torque on the hydraulic motor 22. Data from the transducer 52 and rotational sensor 48 are transmitted to a programmable logic controller (PLC) or computer 54. One embodiment utilizes an Allen-Bradley SLC 500 PLC. Many computers, such as a PC, are adaptable to perform the required computing functions.

The computer 54 receives and transmits data to a monitor/key pad 56. The computer 54 is also connected to a brake actuator valve 58 that controls the flow of fluid to the brake calipers 44 and thus controls the braking function. The computer 54 is also connected to motor actuator valves 60a, 60b. The motor actuator valves 60a, 60b control the flow of fluid to the hydraulic motor 22. Through the motor actuator valves 60a, 60b, the computer 54 controls the rotation of the hydraulic motor 22.

The computer 54 interprets the data received from the sensor 48 and converts the data to a visual output which is shown on the monitor/keypad 56. The visual output illustrates the actual rotation of the drill string 14 from a selected neutral position. The rotational information is also stored in the computer 54 to monitor compliance with operator commands.

The computer 54 may convert data from the bidirectional differential pressure transducer 52 to a visual output indicating the torque acting on the hydraulic motor 22. The computer 54 may also use the pressure data to maintain the applied torque levels within the limits of the drill string.

The operator may input a desired top drive quill 32 rotation through the monitor/key pad 56. The computer 54, upon receipt of the command, opens the motor actuator valve 60a to advance the hydraulic motor 22 in the proper direction. Opening the motor actuator valve 60a overrides the counterbalance valve and allows the hydraulic motor 22 to advance in the proper direction. The computer also actuates the brake valve 58 to release the pressure on the calipers 44 and thus free the brake disk 40. The sensor 48 will send data to the computer 54 indicating the advancement of the top drive quill 32. When the computer 54 receives data from the sensor 48 indicating the top drive quill 32 has rotated the desired amount, the computer 54 actuates the brake valve 58 to apply pressure to the calipers 44 and thus hold the brake disk 40. The computer also closes the motor actuator valve 60a which reactivates the counterbalance valve. By utilizing the above process, the operator may advance the top drive quill 32 a specific number of degrees, in either direction, with certainty.

The operator may also input a desired drill string oscillation amplitude. Ideally, the drill string oscillation amplitude rotates the drill string 14 in one direction as far as possible without rotating the toolface. Then, the drill string 14 is rotated in the opposite direction as far as possible without rotating the toolface. This oscillation reduces the friction on the drill string 14. Reduced friction improves drilling performance because more pressure may be applied to the bit 18. Once the desired oscillation amplitude is entered through the monitor/key pad 56, the computer 54 opens the motor actuator valve 60a, releases the brake disk 40 and rotates the top drive quill 32 the desired amount in one direction. The computer 54 then closes the motor actuator valve 60a for that direction and opens the motor actuator valve 60b to rotate the top drive quill 32 in the opposite direction. Once the top drive quill 32 has advanced the desired amount in the second direction, the motor actuator valve 60b is closed and motor actuator valve 60a is reopened and the top drive quill 32 is rotated in its original direction until it reaches the desired position. This process is repeated until a stop command is entered through the monitor/key pad 56.

Thus, for example, when an operator enters a command to oscillate the top drive quill 180 degrees, the computer 54 rotates the top drive quill 90 degrees clockwise from its neutral position. The computer then stops the clockwise rotation and rotates the quill 180 degrees counterclockwise and stops. The computer 54 then rotates the quill 180 degrees clockwise. The cycle is repeated until a stop command is received. When a stop command is received, the computer 54 returns the quill 32 to its neutral position.

In another embodiment, a down hole MWD sensor 62 transmits toolface orientation information to the computer 54. The computer 54 automatically adjusts the quill rotation to achieve or maintain a desired toolface orientation.

The data from the MWD sensor 62 may also be used to optimize the oscillation function. The amplitude of the oscillation can be gradually increased until a resulting oscillation first becomes apparent at the MWD sensor. This then minimizes friction between the drill string and the wellbore without disturbing the steering process. If the data from the MWD sensor indicates that this oscillation amplitude is disturbing the downhole tool, the computer reduces the oscillation amplitude. Alternatively, the computer 54 can increase the oscillation amplitude until the MWD sensor indicates a downhole tool disturbance. Then the computer 54 can decrease the oscillation amplitude a predetermined amount.

The invention is not limited to the specific embodiments disclosed. It will be readily recognized by those of ordinary skill in the art that the inventive concepts disclosed may be expressed in numerous ways. The following claims are intended to cover all expressions of the inventive concepts disclosed above.

What is claimed is:

[1. A drill string drive comprising:
a motor adapted to rotate a drill string;
a sensor adapted to detect the rotation of said drill string at the surface; and
a computer receiving rotational information from said sensor, said computer transmitting control signals to said motor, said computer programmed to control said motor to advance said drill string to a predetermined angle.]

[2. A drill string drive comprising:
a motor adapted to rotate a drill string;
a sensor adapted to detect the rotation of said drill string; and
a computer receiving rotational data from said sensor and transmitting control signals to said motor, said computer programmed to control the rotation of said motor, said computer advancing said drill string a predetermined angle in a first direction and then reversing said rotation and advancing said drill string a predetermined angle in a second direction.]

[3. A drilling system comprising:
a motor;
a drill string connected to said motor;
a first sensor adapted to detect the rotation of said motor at the surface;
a bit at the distal end of said drill string;
a second sensor adapted to detect the orientation of said bit; and
a computer adapted to receive information from said first sensor and said second sensor.]

[4. A drilling method comprising:
monitoring the rotation of a drill string with a sensor at the surface;
transmitting said rotational information to a computer;
controlling a motor that rotates said drill string with said computer; and
rotating said drill string to a predetermined angle.]

[5. A drilling method comprising:
monitoring the rotation of a drill string with a sensor;
transmitting said rotational information to a computer;
controlling a motor that rotates said drill string with said computer; and
oscillating said drill string between predetermined angles.]

[6. A directional drilling method comprising:
monitoring the rotation of a drill string with a first sensor at the surface;
monitoring the orientation of a downhole tool with a second sensor, said downhole tool being connected to the end of said drill string;
transmitting said drill string rotational information to said computer;
transmitting said downhole tool orientation information to said computer;
controlling a motor that rotates said drill string with said computer; and
rotating said drill string with said computer controlled motor to a predetermined angle such that said downhole tool is rotated to a predetermined orientation.]

*7. A drilling method comprising:*
*monitoring the rotation of a drill string with a sensor;*
*transmitting said rotational information to a computer;*

*controlling a motor that rotates said drill string with said computer; and*

*oscillating said drill string between predetermined angles.*

*8. The drilling method of claim 7, wherein said drill string is oscillated between predetermined angles without substantially disturbing a steering process.*

*9. The drilling method of claim 7, wherein said drill string is oscillated between predetermined angles without rotating a downhole tool.*

*10. The drilling method of claim 7, further comprising generating a visual output that illustrates the rotation of said drill string from a neutral position.*

*11. The drilling method of claim 7, further comprising generating a visual output that includes torque information associated with said motor.*

*12. The drilling method of claim 7, wherein oscillating said drill string comprises continuously oscillating said drill string without substantially disturbing a steering process.*

*13. The drilling method of claim 7, further comprising inputting a desired drill string oscillation amplitude into the computer.*

*14. The drilling method of claim 7, wherein the sensor is at the surface.*

* * * * *